(12) United States Patent
Thogersen et al.

(10) Patent No.: US 9,937,893 B2
(45) Date of Patent: Apr. 10, 2018

(54) MAGNETICALLY ACTUATED PERSONNEL RESTRAINT SYSTEM

(75) Inventors: Paul P. Thogersen, Brownsburg, IN (US); Michael D. Pepe, Noblesville, IN (US); James Casassa, Indianapolis, IN (US); William E. Dickinson, Greenfield, IN (US); Stuart B. Nightenhelser, Indianapolis, IN (US)

(73) Assignee: Wolf Technical Services, Inc., Indianapolis, IN (US)

( * ) Notice: Subject to any disclaimer, the term of this patent is extended or adjusted under 35 U.S.C. 154(b) by 1083 days.

(21) Appl. No.: 13/420,444

(22) Filed: Mar. 14, 2012

(65) Prior Publication Data

US 2012/0261502 A1 Oct. 18, 2012

Related U.S. Application Data

(63) Continuation of application No. 11/598,934, filed on Nov. 14, 2006, now abandoned.

(60) Provisional application No. 60/597,163, filed on Nov. 14, 2005.

(51) Int. Cl.
*B60R 22/34* (2006.01)
*B60R 22/00* (2006.01)
*B60R 22/28* (2006.01)

(52) U.S. Cl.
CPC ...... *B60R 22/341* (2013.01); *B60R 2022/005* (2013.01); *B60R 2022/284* (2013.01)

(58) Field of Classification Search
CPC ............................ B60R 22/341; B60R 22/3413
USPC .... 192/12 B, 48.3, 48.5, 84.3, 105 CD, 215; 188/164, 267, 158, 159, 161; 410/97, 410/100; 310/105; 297/470; 119/794, 119/796, 669–671; 244/122 B, 118.5, 244/118.1, 110 C, 115; 182/234, 239; 242/379.1, 381, 396, 419.3, 419.5, 419.9, 242/422.2, 147 M, 150 M, 155 M See application file for complete search history.

(56) References Cited

U.S. PATENT DOCUMENTS

| | | | |
|---|---|---|---|
| 3,595,495 A * | 7/1971 | Cloeren | ..................... 242/413.9 |
| 4,434,951 A | 3/1984 | Nakajima | |
| 4,567,963 A * | 2/1986 | Sugimoto | ..................... 182/236 |
| 5,236,069 A | 8/1993 | Peng | |
| 6,168,107 B1 * | 1/2001 | Bishop et al. | ................ 242/381 |
| 6,237,728 B1 | 5/2001 | Kobayashi et al. | |

(Continued)

FOREIGN PATENT DOCUMENTS

JP 05252800 A * 9/1993 .............. H02P 15/00

*Primary Examiner* — Sang K Kim
*Assistant Examiner* — Juan J Campos, Jr.

(57) ABSTRACT

A restraint system for a vehicle, includes a rotatable reel, a flexible tether, a first shaft and a conductor member. The flexible tether has a first end coupled to the reel and a second end. The tether is wound upon the rotatable reel and movable in both a winding direction and an unwinding direction. The first shaft is configured to be operably coupled to the rotatable reel, and includes a plurality of magnetic elements affixed thereto. The conductor member has a hollow interior. At least a portion of the first shaft and at least a portion of the plurality of magnetic elements are disposed within the hollow interior. Movement of the tether in the unwinding direction causes relative movement between the plurality of magnets and the conductor member. Eddy currents within the conduct member generate a retarding force on the first shaft.

16 Claims, 13 Drawing Sheets

(56) References Cited

U.S. PATENT DOCUMENTS

| | | |
|---|---|---|
| 6,286,637 B1 | 9/2001 | Park et al. |
| 6,523,650 B1 | 2/2003 | Pribonic et al. |
| 6,698,554 B2 | 3/2004 | Desta et al. |
| 6,756,870 B2 | 6/2004 | Kuwahara |
| 6,974,100 B2 | 12/2005 | Moosberg |
| 7,057,321 B2 | 6/2006 | Kuwahara |

* cited by examiner

MAGNETICALLY ACTUATED PERSONNEL RESTRAINT SYSTEM

PRIORITY DATA

This application is a continuation of U.S. patent application Ser. No. 11/598,934, filed 14 Nov. 2006, which in turn claims the benefit of U.S. Provisional Patent Application No. 60/597,163 which was filed on 14 Nov. 2005, both of which are incorporated in the entirety herein by reference.

GOVERNMENT INTEREST

This invention was made with government support under SBIR Contract No. FA8650-05-M-6560 granted on 15 Apr. 2005. The government has certain rights in the invention.

TECHNICAL FIELD OF THE INVENTION

The present invention relates to a restraint system, and more particularly to a reel-based tether system for restraining cargo, such as personnel in and on moving vehicles.

BRIEF SYNOPSIS OF THE FEATURES OF THE INVENTION

The present invention relates to a magnetic drag device for retarding unintended or undesired extraction of webbing type tethers from the reel during vehicle acceleration events, and for attenuating and dissipating the energy being transmitted to the user during such acceleration events. The present invention further relates to a magnetically-actuated clutch device for controlling the engagement and disengagement between the webbing reel and the magnetic drag device. The present invention further relates to a coiled spring motor arrangement for retracting slack webbing back onto the reel after extraction. The present invention further relates to a length control mechanism for limiting the extent of permitted webbing extraction at a desired, settable maximum.

BACKGROUND

Personnel in and on moving vehicles can be subjected to high acceleration environments, such as a crash or quick velocity change that give rise to rapid relative motion between the vehicle and the occupant. These environments create a risk of injury due to contact with vehicle or equipment structures, a risk of acceleration-related injury, and a risk of inadvertent ejection from the vehicle. The risk of injury is especially pronounced with personnel who cannot be restrained in a typical seat restraint system due to mobility requirements, such as with mobile aircrew members aboard the personnel/cargo bays of military helicopters.

Systems currently in use for restraining helicopter mobile aircrew include the gunner's belt with fixed-length tether, or an inertia reel-based system which locks an otherwise rotatable webbing spool upon excessive inertial input from the vehicle or upon excessive acceleration of webbing extraction. The drawbacks to the gunner's belt with a fixed-length tether are that the user is free to flail at any point within the sphere of reach of the tether. In a crash pulse or other acceleration input, the tether becomes suddenly taut and transmits the acceleration impulse directly to the user. As such, even though the tether may prevent the wearer from crashing into an interior fixture within the helicopter, the excessive g-forces that are exerted upon the user from the quick stop can still cause extensive injury.

The drawbacks to the inertia reel-based system are that the reel does not lock until an acceleration threshold is exceeded. This gives rise to unwanted webbing-type tether extraction and free travel. Once the webbing locks its length, the webbing becomes suddenly taut and transmits the acceleration impulse directly to the user, which can load the user with excessively high g-forces.

Both systems allow unwanted free travel of the user at high velocities relative to the vehicle, unwanted contact with vehicle structures at high velocity, possible inadvertent ejection or partial ejection from the vehicle due to unwanted free travel, and transmission of acceleration impulses to the user at the end of the travel. Both systems therefore give rise to contact injuries, acceleration injuries and compression injuries, as well as the dangers associated with travel outside the vehicle envelope.

SUMMARY OF THE INVENTION

In accordance with the present invention, a magnetically actuated cargo restraint system for a vehicle comprises a rotatable reel, and a flexible tether. The tether has a first end coupled to the reel and a second end capable of being coupled to a cargo item. The tether is windable around the reel, and is movable in both a winding direction and an unwinding direction. The system contains a magnetic drag device that includes a magnet containing member having a plurality of magnets thereon, and a conductor member. The magnet containing member and magnetic conductor are moveable with respect to each other, and one of the magnetic containing member and conductor member is capable of being fixedly coupled to the reel for movement with the reel. Movement of a cargo item attached to the tether in a direction that causes the tether to move in an unwinding direction on the reel causes movement of the magnet containing member relative to the conductor which generates magnetic eddy currents between the magnet containing member and the conductor to thereby create a retarding torque on the reel that resists, but does not prevent, movement of the tether in an unwinding direction on the reel to thereby retard movement of the cargo item.

Preferably, the cargo item comprises a human being and the vehicle comprises an aircraft such as a helicopter or airplane.

In accordance with a preferred embodiment of the present invention, A magnetically-actuated, energy-attenuating and -dissipating system for safely restraining mobile personnel in and on moving vehicles is disclosed. The system consists of a length of webbing strap spooled onto a rotatable reel which is connected through a central shaft to a magnetic drag device. The magnetic drag device resists the rotation of the webbing reel with a retarding torque that is proportional to the rotational velocity of the webbing reel. The webbing reel is engaged to and disengaged from the central shaft, and therefore to and from the magnetic drag device, by means of a magnetically-actuated clutch device.

The clutch device disengages the webbing reel from the central shaft during retraction of the webbing back onto the reel. The clutch device engages the webbing reel to the central shaft during extraction of the webbing from the reel, after the rotational velocity of the reel during extraction exceeds a pre-determined value.

The webbing reel is also connected to a retractor, such as a coiled spring motor which provides the torque necessary to fully retract the slack webbing onto the reel. An extraction length controller enables the user to pre-set the maximum extent to which webbing may be extracted from the reel, to limit the extent of travel of the user from the system attachment point, in order to prevent inadvertent ejection from the vehicle and inadvertent contact with vehicle structures.

The present invention manages the kinetic energy of the user during vehicle acceleration events by exerting a drag on a webbing reel during webbing extraction whenever the angular rate of the webbing reel exceeds a pre-determined design value. In the present invention, the magnitude of the drag is proportional to the angular velocity of the webbing reel.

The advantages of the present invention are that it produces a magnitude of webbing restraint that automatically increases with increasing dynamics between the user and the vehicle. The device attenuates vehicle acceleration pulses (spikes) that would otherwise be transmitted directly to the user through the webbing.

Turning now to FIG. 1, it will be noted that initial acceleration, IA of a velocity change event, such as a crash, causes a high acceleration (g-force) spike over a short period of time (here, 0.5 seconds) that, at its peaks imparts an acceleration load upon a user of somewhere between 40 gs and 50 gs. By contrast, the attenuation of accelerations achieved with the present invention imparts a load WL that is not as "spiky". In the graph of the hypothetical crash event of FIG. 1, it will be noted that the present invention produces an acceleration load of less than 9 gs on the user, which, while being spread out over a longer period of time (here, about 0.15 seconds), is less damaging to the user because the g-forces are so much reduced.

In the example shown in FIG. 1, the device of the present invention is shown to significantly slow the velocity of motion of the user relative to the vehicle during the attenuation of the acceleration pulse. The device dissipates the kinetic energy of the user during the attenuation of the acceleration pulse. It acts automatically and immediately upon engagement of the magnetically-actuated clutch. It limits the maximum range of unintended motion of the user by a user-settable control, and it allows user freedom of motion at lower velocities. The device operates autonomously, requires no user intervention, and requires no input power.

The present invention uses a magnetic drag device that acts to retard the rotational motion of a central shaft that extends axially through the center of the webbing reel and the drag device. During extraction of webbing from the webbing reel, the webbing reel is engaged to the central shaft by means of a magnetically-actuated clutch device. Engagement of the central shaft causes it to rotate with the webbing reel, thereby rotating the magnet components centrally located within the magnetic drag device. As the magnet components rotate within the magnetic drag device, eddy currents are generated in a circumferential conductor cylinder and a retarding torque is generated which is proportional to the angular rate of rotation.

The use of the magnetically-actuated clutch device enables engagement of the webbing reel with the central shaft at very low relative rotational speeds, such as those that would typically be encountered if the tether were being extracted from the reel at a rate of between about 3 and 5 feet per second. This is not believed to be achievable with a centrifugal-type clutch or any other available clutch.

The present invention also includes a coiled spring motor for retracting slack webbing back onto the webbing reel. The spring motor consists of a storage reel and a take-up reel, with a flat coil spring wound between the two reels such that the direction of winding is opposite on the two reels. The coil spring winds preferentially on the storage reel. Manual extraction of the webbing from the webbing reel causes rotation of the spring motor and transfer of the coil spring from the storage reel onto the take-up reel.

The spring motor preferentially returns webbing onto the storage reel from the take-up reel whenever slack develops in the extracted webbing, causing webbing to be retracted onto the webbing reel. The design of the spring motor in the present device is such that the torque developed by the spring motor for resisting webbing extraction and for effecting webbing retraction is constant throughout the action of the spring motor.

The present invention also includes a manual length control device. The length controller consists of a threaded follower that moves axially along a threaded portion of the webbing reel shaft whenever the webbing reel shaft is rotated during webbing extraction and retraction. The length controller also includes a cylindrical threaded follower stop that connects to an adjustment knob. Turning the adjustment knob in either direction results in threading of the follower stop along the webbing reel shaft in the corresponding axial direction.

Rotation of the webbing reel shaft causes the follower to move axially along the webbing reel shaft until it contacts the follower stop, at which time the axial motion of the follower is arrested, in turn arresting the rotational motion of the webbing reel. Adjustment of the follower stop location via the adjustment knob determines the degree of total rotation allowed for the webbing reel, and thus the degree of total webbing extraction from the webbing reel.

These and other features of the present invention will be best appreciated from a review of the drawings and description below, which present the best mode perceived presently by the Applicants of practicing the invention.

DESCRIPTION OF THE PREFERRED EMBODIMENTS

Figure 1:
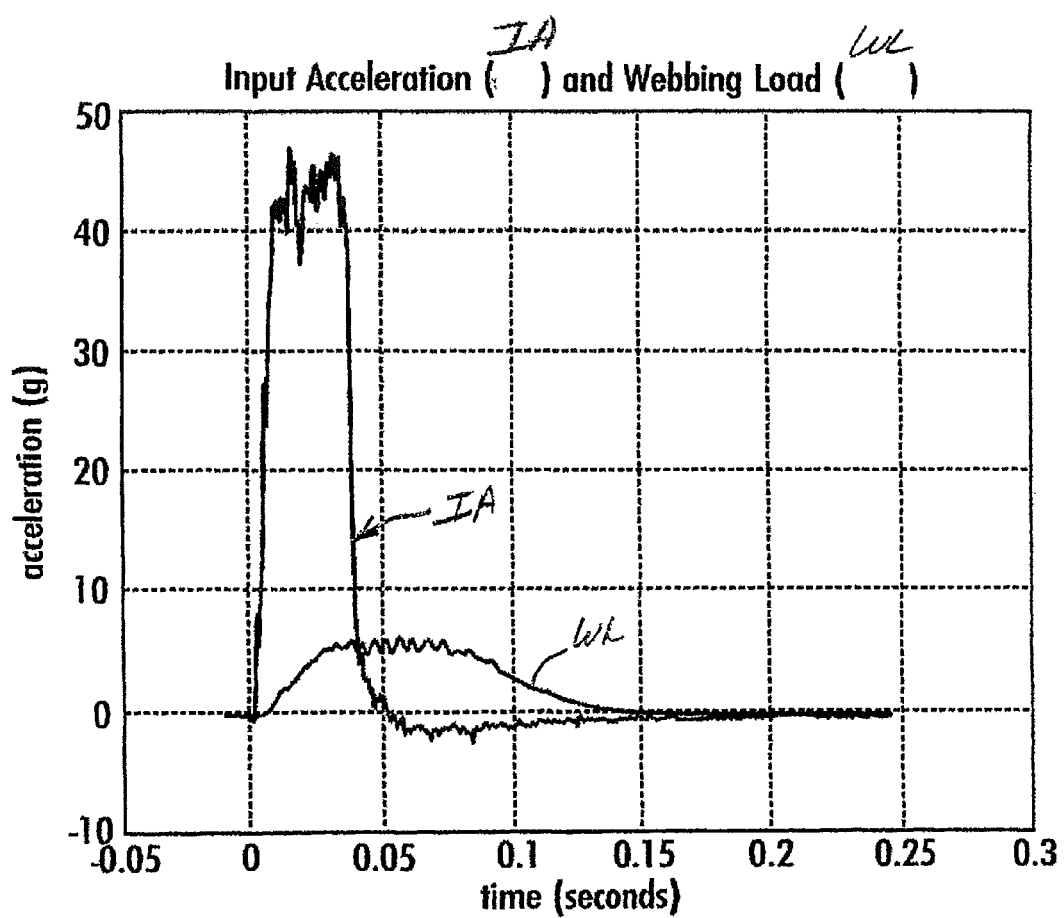
FIG. 1 is a graphical representation showing the acceleration input over time caused by a hypothetical vehicle acceleration change event (such as a crash), in comparison to the acceleration input (load placed upon a hypothetical cargo item, such as a person) wherein such acceleration force is attenuated by the present invention.
Figure 2:
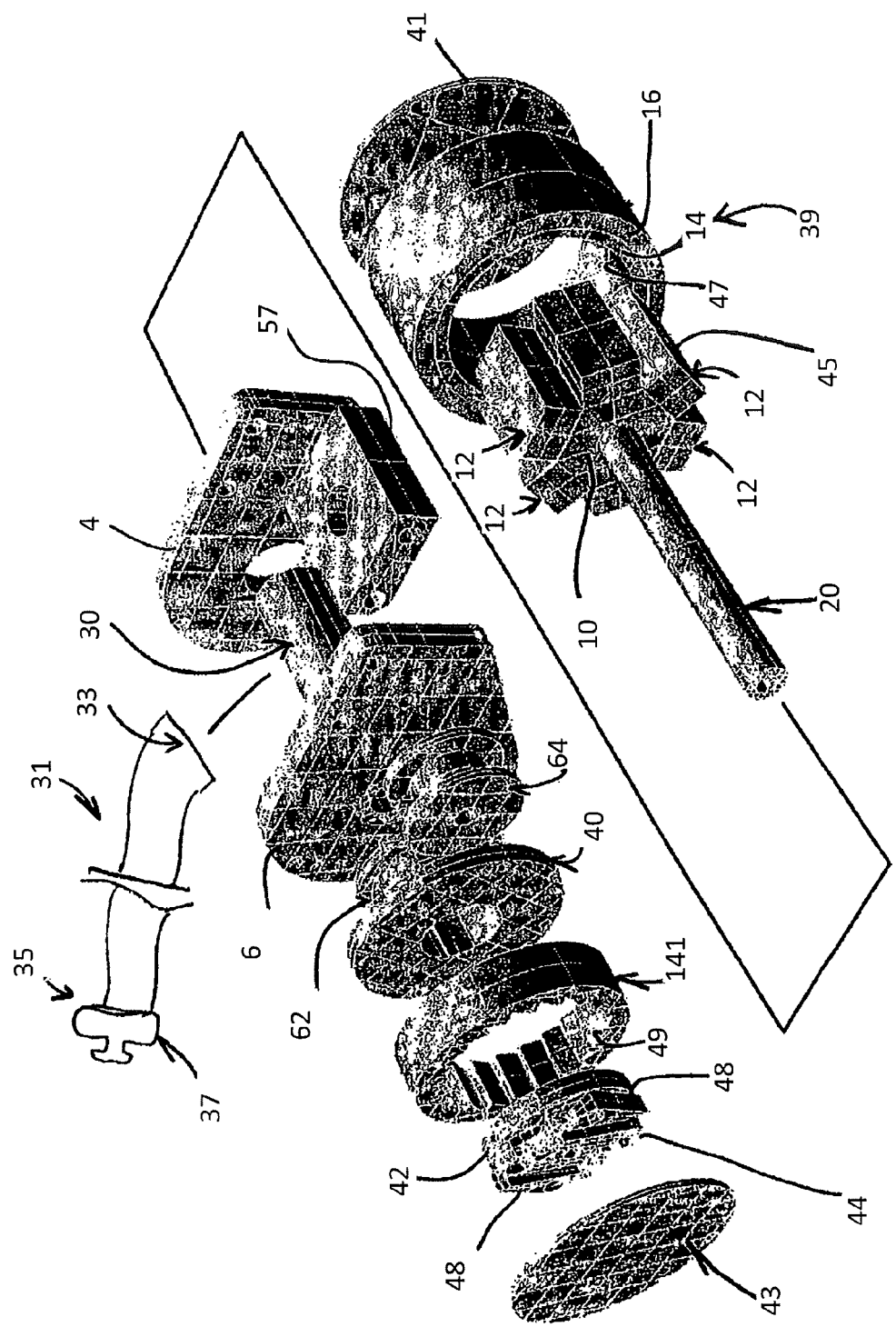
FIG. 2 is an exploded view of the magnetic restraint device mechanism of the present invention.

The geometric relationships between components of the preferred embodiment are shown in the exploded view of FIG. 2. The components are detailed in FIG. 3 through FIG. 8. Components of the personnel restraint system are consistently numbered throughout all the figures.

Figure 5A:
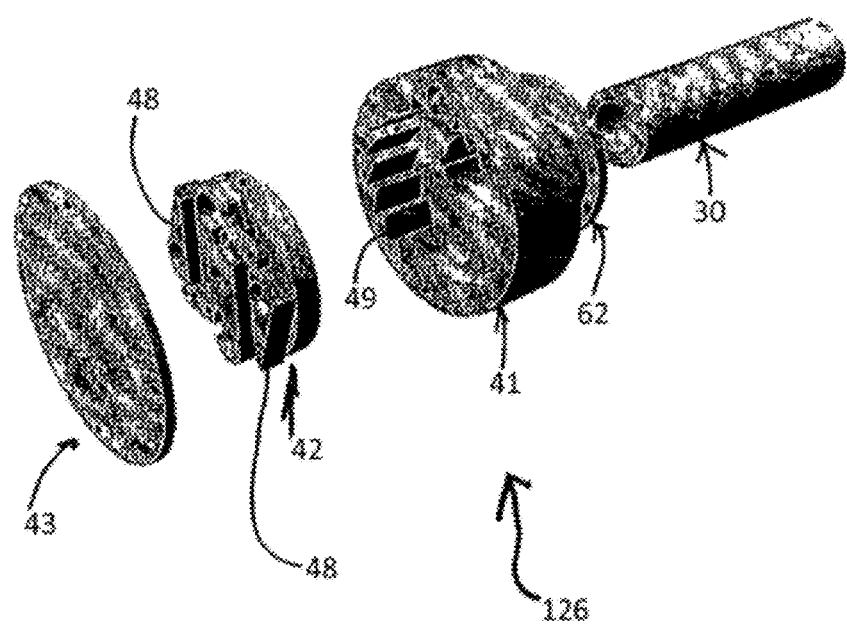
FIG. 5A is an exploded perspective view of the clutch mechanism of the present invention.
Figure 5B:
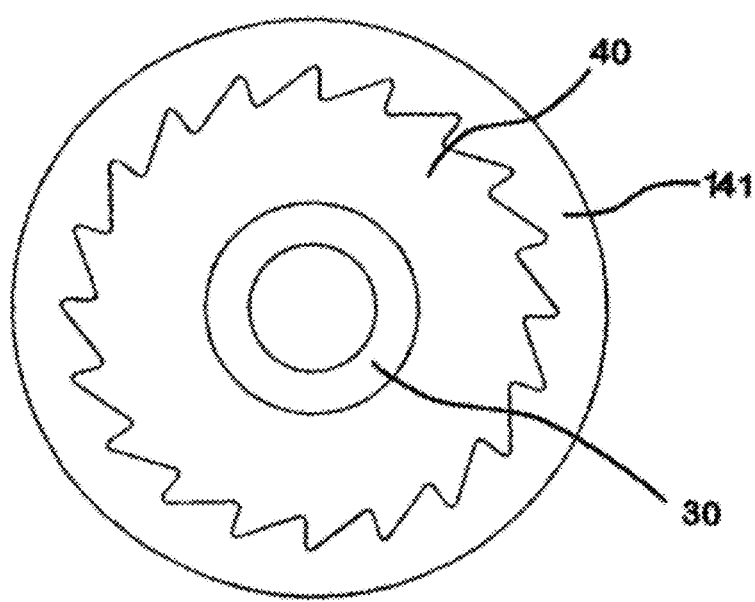
FIG. 5B is a side view of the pawl and ratchet component of the magnetic clutch of the present invention.
Figure 5C:
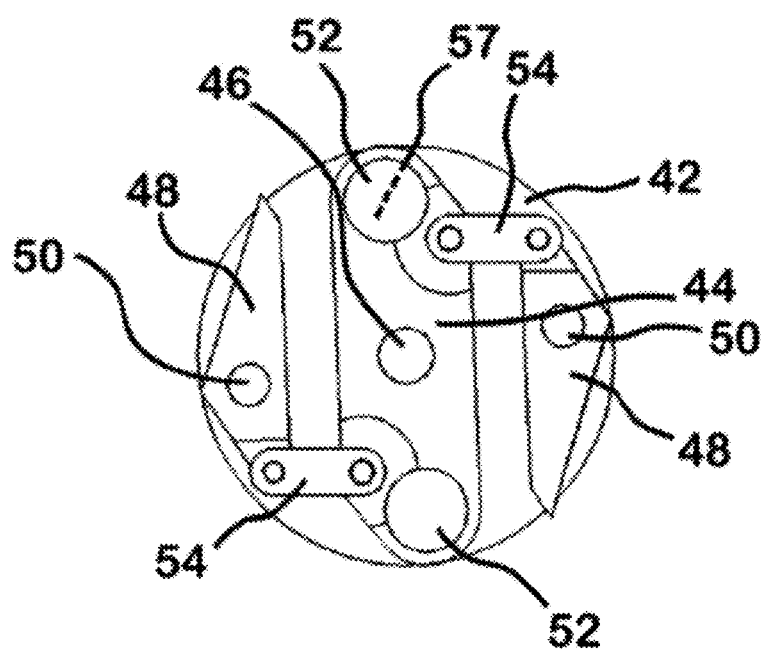
FIG. 5C is a side view of the clutch device of the present invention showing the ratchet engaging pawl.
Figure 9:
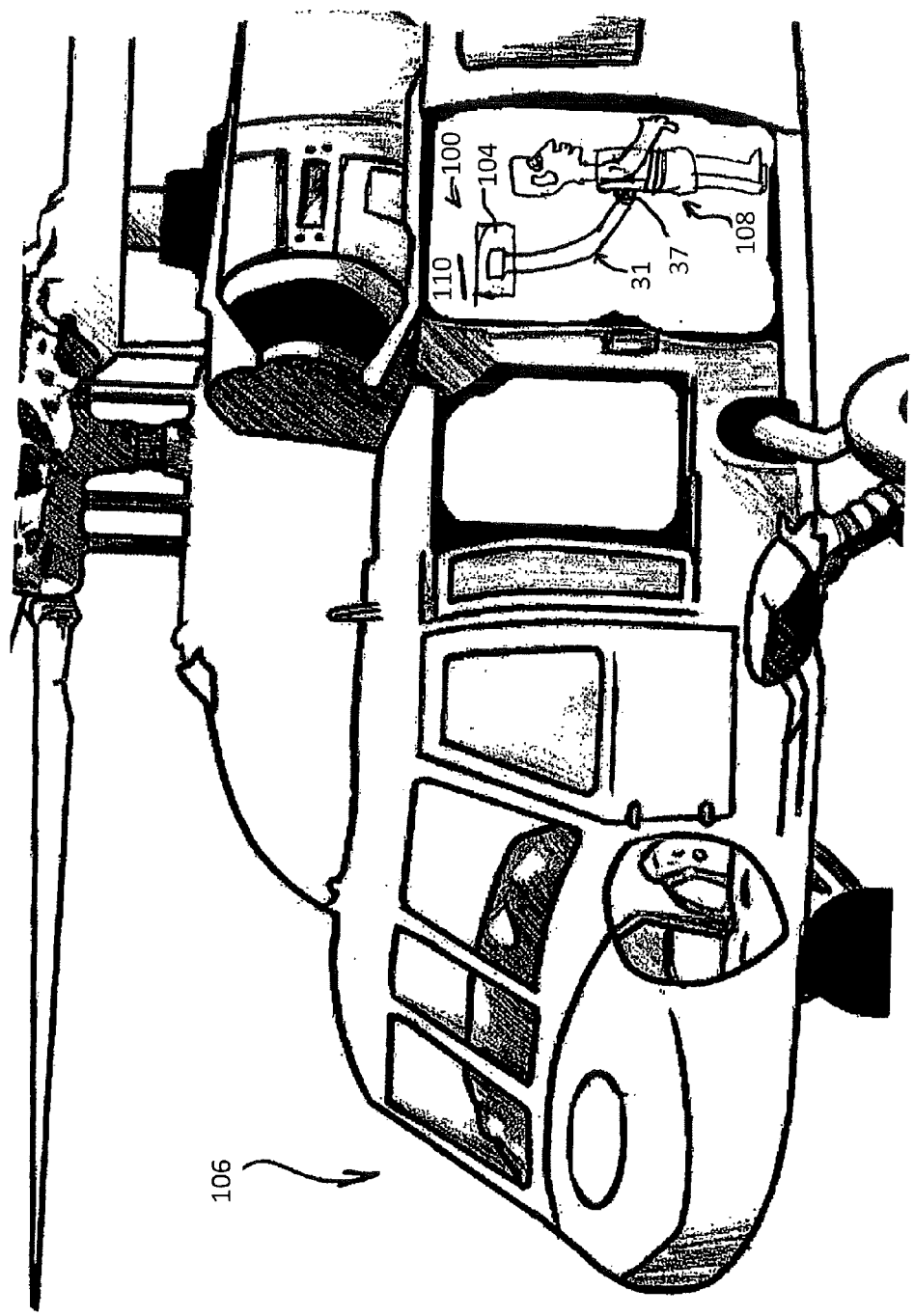
FIG. 9 is a perspective view of magnetic restraint device mounted in a helicopter-type aircraft.
Figure 10:
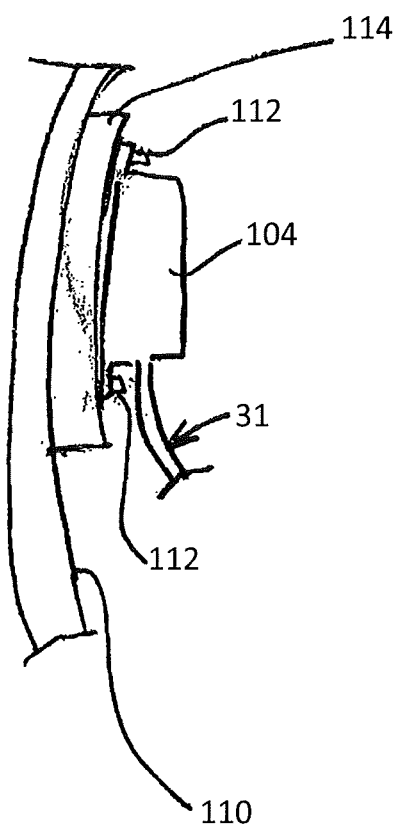
FIG. 10 is a schematic side view of the housing magnetic restraint device of the present invention coupled to a vehicle, and in particular a helicopter-type aircraft.

A magnetically actuated cargo restraint system 100 for a vehicle such as a helicopter-type aircraft 106 is shown in the drawings, and includes a housing that may bear a vague similarity to an enlarged seat belt housing. The housing 104 (FIG. 9) is preferably a two-piece clam shell type housing 104 large enough to house the internal components of the system 100. In FIGS. 2 and 5A, the components shown that are contained within the housing 104 include a pair of disk-shaped end plates 41, 43 which are disposed at either end of the device 100. Turning first to FIGS. 9 and 10, the magnetic restraint device 100 is shown mounted in a vehicle, here shown as a helicopter 106 type aircraft. The housing 104 is mounted on a vehicle member, here shown as a wall 10 or the helicopter 106. The tether 31 of the device 100 connected to a cargo item, here shown as a human being 108, who is also the user of the device. However, it will be appreciated that the tether 31 can be coupled to a non-human cargo item. In FIG. 10, the housing 104 is shown as having an attachment member, here shown as a structural frame member 114 of the helicopter 106.

The components of the device are shown as including a rotatable reel 30, and a flexible tether 31. The tether 31 has a first end 33 coupled to the reel 30 and a second end 35 that may contain a buckle 37 capable of being coupled to a cargo item, such as a helicopter aircrew member. The tether 31 is preferably a seat belt-like webbing material 31 type tether and is windable around the reel 30, and is movable in both a winding direction and an unwinding direction.

A magnetic drag device 39 includes a magnet containing member (such as polygonal hub 10) having a plurality of magnets 12 thereon, and a cylindrically-shaped magnetically conductive magnetic conductor member shown here as a conductor cylinder 14. The magnet containing member (hub 10) and magnetic conductor 14 are moveable relative to each other, and one of the magnetic containing member (hub 10) and conductor cylinder 14 is capable of being fixedly coupled to the reel 30 for movement with the reel 30.

Movement of a cargo item attached to the tether 31 in a direction that causes the tether 31 to move in an unwinding direction on the reel 30 causes movement of the magnet containing member 10 and conductor cylinder 14 relative to each other which generates magnetic eddy currents between the magnet containing hub 10 and the conductor cylinder 14 to thereby create a retarding torque on the reel 30 that resists, but does not prevent, movement of the tether 31 in an unwinding direction on the reel to thereby retard movement of the cargo item.

The central axial component throughout the restraint system is the solid central shaft 20. The central shaft 20 connects the polygonal hub 10 of the magnetic drag device with the pawl plate 42 of the magnetic clutch device. The central shaft 20 and the polygonal hub 10 are fabricated as one steel part.

A plurality of permanent magnets 12 are adhered to the corresponding flats of the polygonal hub 10 such that the permanent magnets 12 are arranged circumferentially about the central shaft 20. The particular embodiment shown in the figures utilizes six permanent magnets 12 adhered to a hexagonal hub 10. In alternate embodiments, any plurality of permanent magnets 12 may be employed in a corresponding polygonal circumferential arrangement. The number of permanent magnets employed in a particular embodiment is determined by the desired magnitude of retarding torque for a particular restraint system application.

Figure 3:
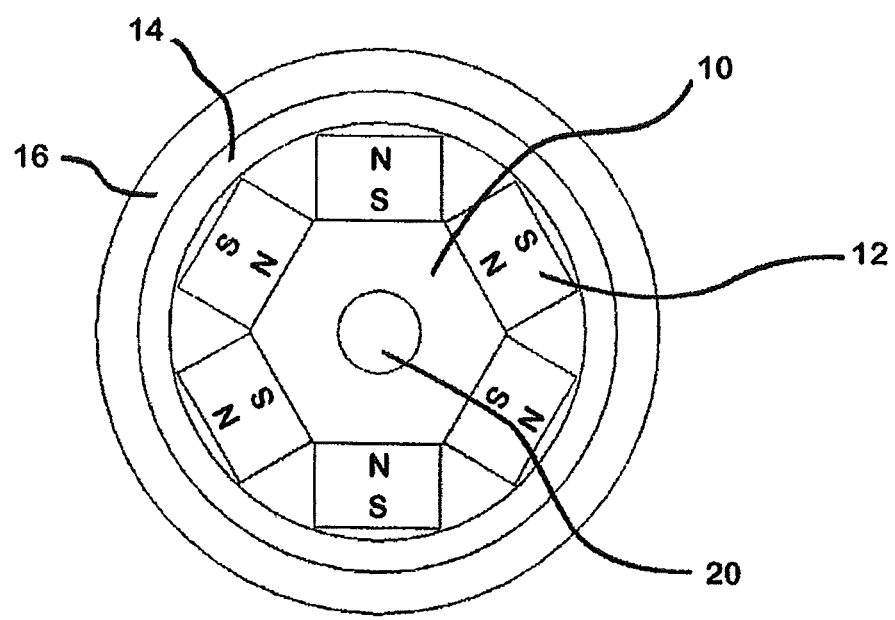
FIG. 3 is a view of a magnet-containing device and conductor of the present invention.
Figure 4:
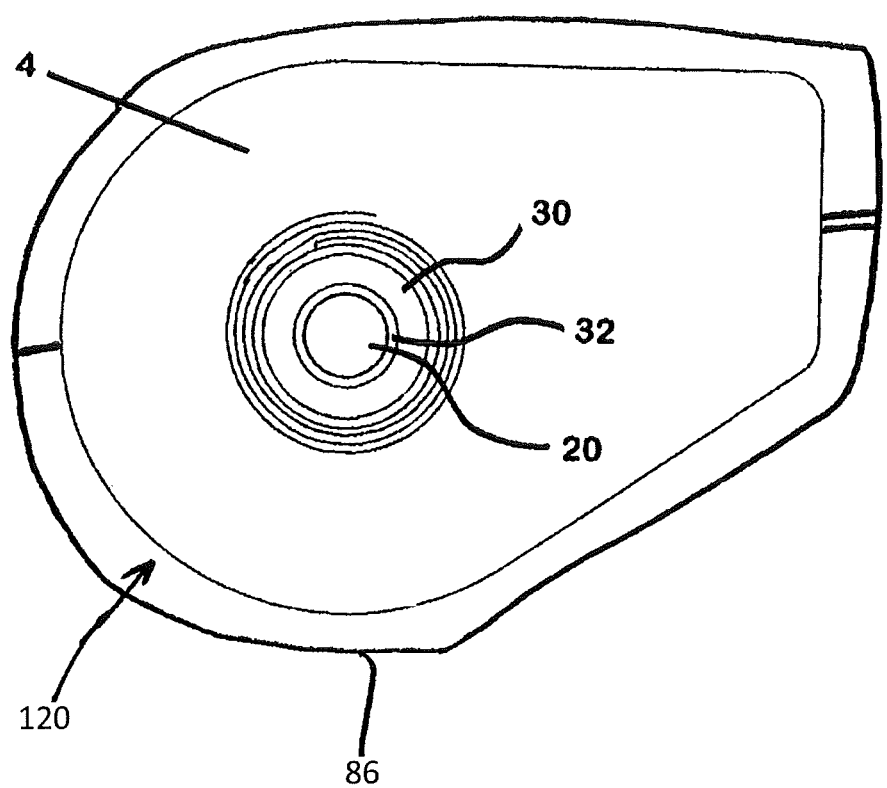
FIG. 4 is a side view of a spring motor of the present invention.

The permanent magnets 12 are polarized such that their axis of polarization extends radially outward from the central shaft 20 and is normal to the central shaft 20 as shown in the figure. The placement of the permanent magnets 12 is such that the north-south pole directions alternate between adjacent magnets, as best shown in FIG. 3.

A conductor cylinder 14, composed of an electrically and magnetically conductive metal such as copper, is placed concentrically about the permanent magnet arrangement 12 such that the central axes of the polygonal hub 10 and the conductor cylinder 14 coincide and are co-linear. The conductor cylinder 14 is further arranged to minimize the clearance (gap) between the top (outer) pole surfaces (e.g. 45) of the permanent magnets 12 and the inner surface 47 of the conductor cylinder 14.

In an alternate embodiment, the top (outer) pole surfaces of the permanent magnets 12 are fabricated with a convex radius that conforms with the inner radius of the conductor cylinder 14 so that the clearance between the outer surface 45 of the permanent magnets 12 and the inner surface 47 of the conductor cylinder 14 is minimized across the entire surface area. The type and thickness of material of the conductor cylinder 14 is chosen such that sufficient eddy current can be generated within the conductor cylinder 14 in order to achieve the desired retarding torque.

A steel surround 16 is placed around and in contact with the conductor cylinder 14 in order to provide structural strength for the magnetic drag device and to provide a magnetic flux return path. An end plate 41 is affixed to the steel surround in order to enclose the magnetic drag device.

Webbing 31 is spooled onto the webbing reel shaft 30 between bearing plates 4 and 6. The webbing reel shaft 30 is coaxial with the central shaft 20 and includes a hollow interior for interiorly receiving the central shaft 20, spins freely about the central shaft 20, and is spaced apart from the central shaft 20 by a bushing 32. The webbing reel shaft 30 projects through each bearing plate 4 and 6 and is separated from the bearing plates 4 and 6 by bushings 32.

One end of the webbing reel shaft 30 inserts into the bearing plate bushing 32 in bearing plate 4 adjacent to the magnetic drag device, and is free to spin within the bearing plate 4. The other end of the webbing reel shaft 30 is affixed to the take-up reel 62 of the spring motor 120 and to the ring gear plate 40 of the magnetically-actuated clutch device by means of a key piece 68 inserted into a keyway 67. A spacer 57 is disposed between and coupled to each of the bearing plates 4, 6, to maintain them in the appropriate fixed, spaced relation.

Figure 6:
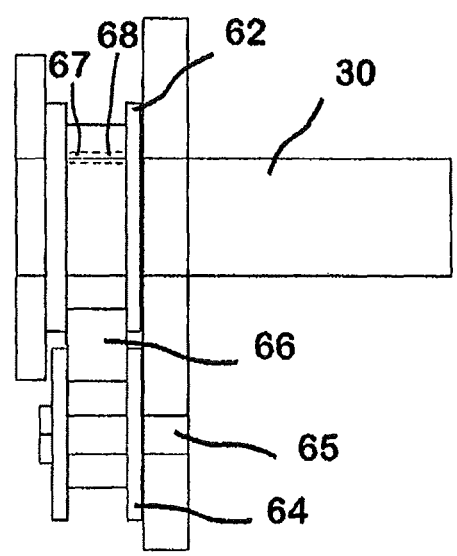
FIG. 6 is an end view of the clutch mechanism.
Figure 7A:
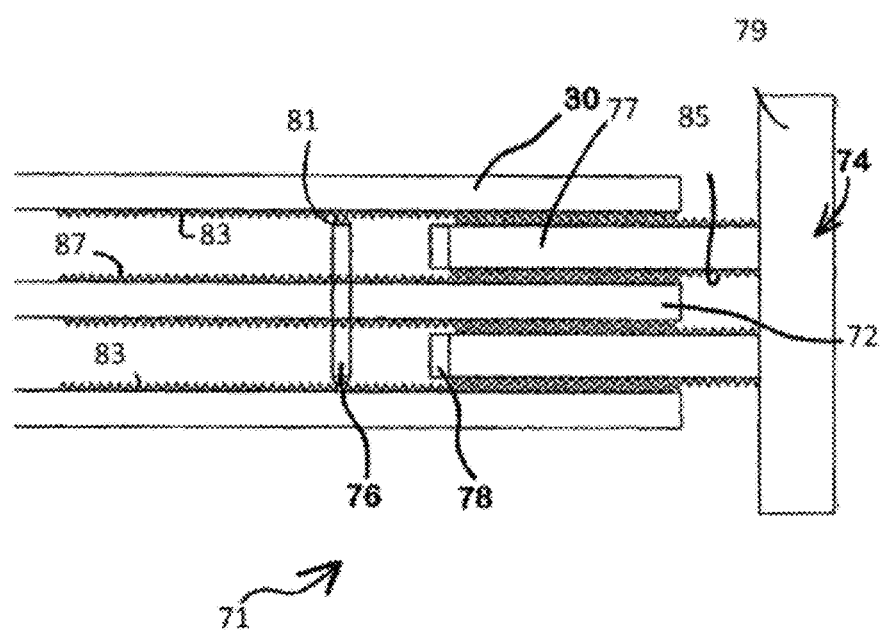
FIG. 7A is a side view of the length controller.
Figure 7B:
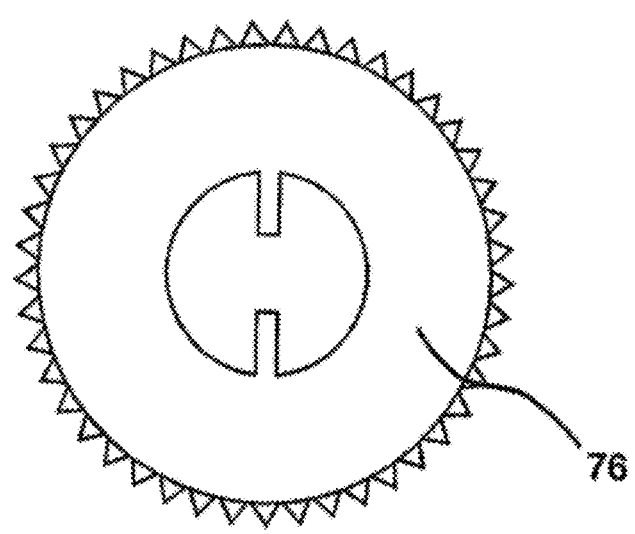
FIG. 7B is an end view of the follower stop.

A retractor, here shown as a spring motor 120 assembly is employed to supply constant torque to the webbing reel in order to retract slack webbing onto the webbing reel shaft 30 and to continually maintain minimal slack in the webbing 31. The spring motor/retractor 120 consists of a storage reel 64, a take-up reel 62 and a coiled flat spring 66 (FIG. 6). One side flange of the take-up reel 62 is formed by the ring gear plate 40 of the clutch device.

The take-up reel 62 is rotationally fixed to the webbing reel shaft 30 by means of a key piece 68 inserted into a keyway 67 in the take-up reel 62 and the webbing reel shaft 30, so that both the ring gear plate 40 and the take-up reel 62 rotate as the webbing 31 reel shaft 30 rotates. The storage reel 64 is mounted to the bearing plate 6 by means of a shoulder bolt 65 or other attachment means which allows free rotation of the storage reel 64. The flat spring 66 is wound and stored on the storage reel 64 when the webbing 31 is in the fully retracted condition. The flat spring 66 is wound onto the take-up reel 62 in the opposite rotational direction from the storage reel 64.

A magnetically-actuated clutch device 126 is employed to achieve mechanical engagement of the central shaft 20 with the webbing reel shaft 30. The clutch includes a ring gear plate 40 that is affixed to the webbing reel shaft 30 by means of a shaft key 68. The ring gear 141 is affixed to the ring gear plate by a plurality of screws. The ring gear 141 consists of a plurality of gear teeth 49 arrayed about its inner circumference that are machined to a size and shape to facilitate engagement by the pawls 48.

The pawl plate 42 is composed of a nonferrous material, and is mounted to the central shaft 20 by means of a key piece inserted into a keyway in the central shaft 20. Mounted to the pawl plate 42 are an arrangement of pawls 48 and a rocker plate 44 (See FIG. 5C). In the described embodiment and figures, an arrangement having two pawls 48 is shown, although various numbers of pawls may be incorporated into a specific design depending on the specific application, load bearing and desired performance of the clutch device.

In various embodiments of the magnetically-actuated clutch device 126 employing various numbers of pawls, the specific design and shape of the rocker plate 44 would necessarily change as well. In this particular embodiment employing two pawls, the pawls 48 are secured to the pawl plate 42 at the pivot end 50 of the pawl; the opposite end of the pawl 48 is machined to facilitate engagement with the ring gear 141. In this particular embodiment, the rocker plate 44 is secured to the center of the pawl plate 42 such that it rotates about a pivot point 46 at the geometric center of the rocker plate 44.

The pawls 48 are secured to the rocker plate 44 by means of pawl links 54. The pawl links 54 cause the pawls to rotate away from a neutral position in concert with the rocker plate 44, and then return to the neutral position in concert with the rocker plate 44.

In the present embodiment employing two pawls 48, the rocker plate 44 is equipped with two cylindrical permanent magnets 52, one at each end of the rocker plate 44, such that the magnets 52 are seated within holes bored through the rocker plate 44 and such that the circular faces of the magnets 52 are flush with the corresponding surfaces of the rocker plate 44. Where the rocker plate 44 and pawls 48 are in the neutral (i.e. the pawls not rotated outward for engagement) condition, two steel docking tabs 57 are situated into the pawl plate, one each directly underlying the locations of the magnets 52 in the rocker plate 44. The purpose of the steel docking tabs 57 is to provide a holding force for keeping the rocker plate 44 in the neutral position until clutch engagement is achieved, and to return the rocker plate 44 to the neutral position after disengagement of the clutch.

The magnetically-actuated clutch device is assembled such that the pawl plate 42 and pawls 48 reside within the circumference of the ring gear 141. The pawl plate 42 and pawls 48 are enclosed within the cavity of the ring gear 141 by means of the end plate 43, that serves as a conductor disk, which is secured to the face of the ring gear and used as a cover. The conductor disk end plate 43 is composed of an electrically conductive material such as copper.

Engagement of the central shaft 20 with a control shaft 30 such as the webbing 31 reel shaft 30 occurs when the engagement end of the pawls 48 rotate radially outward relative to the pawl plate 42, and then engage with the gear teeth of the ring gear 141. Rotation of the pawls 48 is accomplished by means of rotating the rocker plate 44 relative to the pawl plate 42. Rotation of the rocker plate 44 relative to the pawl plate 42 is accomplished by magnetic forces generated through relative rotation between the rocker plate magnets 52 and the conductor disk end plate 43, such magnetic forces being induced by eddy currents that are produced in the conductor disk end plate 43 during the relative motion.

During operation, webbing-type tether 31 is extracted from the restraint system by the user, thereby causing rotation of the webbing reel shaft 30, the take-up reel 62, the ring gear 141 and the conductor disk end plate 43. At webbing 31 extraction velocities less than a particular design value (preferably 3 to 5 feet per second extraction velocity), the pawls 48 do not engage with the ring gear 141, and no retarding force is experienced by the user.

At webbing extraction velocities greater than a particular design value, the rotational motion of the conductor disk end plate 43 relative to the rocker plate magnets 52 produces an instantaneous force that is great enough to overcome the holding force of the steel docking tabs 57. The imbalance of force permits rotation of the rocker plate 44 relative to the pawl plate 42, which in turn causes rotation of the pawls 48 such that the engagement ends of the pawls 48 rotate radially outward and engage with the ring gear 141. Engagement of the pawls 48 and ring gear 141 causes rotation of the central shaft 20 and subsequently the polygonal hub 10 and the permanent magnets 12 within the magnetic drag device 39. Rotation of the permanent magnets 12 within the magnetic drag device 39 produces a retarding torque that is proportional to the velocity of rotation.

After completion of the extraction event, allowance of some slack in the webbing 31 will permit disengagement of the pawls 48 from the ring gear 141, thereby allowing the magnets 52 and steel docking tabs 57 to restore the rocker plate 44 and pawls 48 to the neutral position.

In the present embodiment of the magnetically-actuated clutch, the size and composition of the rocker plate magnets 52, the size and location of the steel docking tabs 57, the thickness and composition of the conductor disk end plate 43, and the clearance gap between the conductor disk 56 and the rocker plate magnets 52, can be traded off to achieve the desired performance in engagement and disengagement of the clutch.

A length controller 71 (FIG. 7A) is provided in the present embodiment of the invention, which allows the user to set the maximum extent of webbing 31 extraction that will be permitted. The length control device 71 acts by imposing a stop on the webbing reel shaft at a preset point in its rotational travel.

In the present embodiment of the length control device 71, a follower stop comprises a stop cylinder 74 includes a cylindrical portion 77 and a knob portion 79. The cylindrical portion 77 includes a threaded interior surface 85 that is threaded onto the threaded outer surface 87 of a solid central shaft 30, that resides inside the webbing reel shaft 30. A knob 79 or similar hold can be formed as a part of stop cylinder 74, or else coupled to stop cylinder 74 to enable the user to turn the stop cylinder 74 in order to move its position along the shaft in the axial direction, and thereby adjust the length to which the webbing-type tether 31 can be extracted. A thrust bearing 78 is used on the end of the stop cylinder 74 opposite the knob 79. A follower ring 76 with a central aperture is fitted over the solid central shaft 72.

The outer circumference 81 of the follower ring 76 is threaded to match threads 83 on the inside circumferential surface of the webbing reel shaft 30. Further the follower ring 76 is notched to match notches in the webbing reel shaft 30, so that the follower ring 76 does not rotate relative to the webbing reel shaft 30.

As the webbing reel shaft 30 rotates, the follower ring 76 moves along the threads 87 on the outside surface of the central control shaft 72 until the stop cylinder 74 and thrust bearing 78 are encountered. When the follower ring 76 encounters the stop cylinder 74 and thrust bearing 78, the webbing reel shaft 30 is prevented from further rotation and no more webbing 31 may be extracted from the restraint device.

In the present embodiment of the invention, the webbing reel 30 and webbing 31 are enclosed in a housing that comprises a cylindrical casing 86 that attaches to the bearing plates 4 and 6. Further in the present embodiment of the invention, the cylindrical casing 86 is fitted with a slot through which the webbing 31 is extracted. Further in the present embodiment of the invention, the spring motor and magnetically-actuated clutch are enclosed in an end casing (not shown), which attaches to the bearing plate 4, and the shape of which conforms to the geometry of the subassemblies contained therein.

Further in the present embodiment of the invention, a vehicle mounting plate 84 is attached between the bearing plates 4 and 6. The vehicle mounting plate 84 is equipped with a hole for a mounting bolt, to which an interchangeable vehicle mount is attached. An interchangeable vehicle mount will ensure compatibility across various vehicle platforms.

Figure 8:
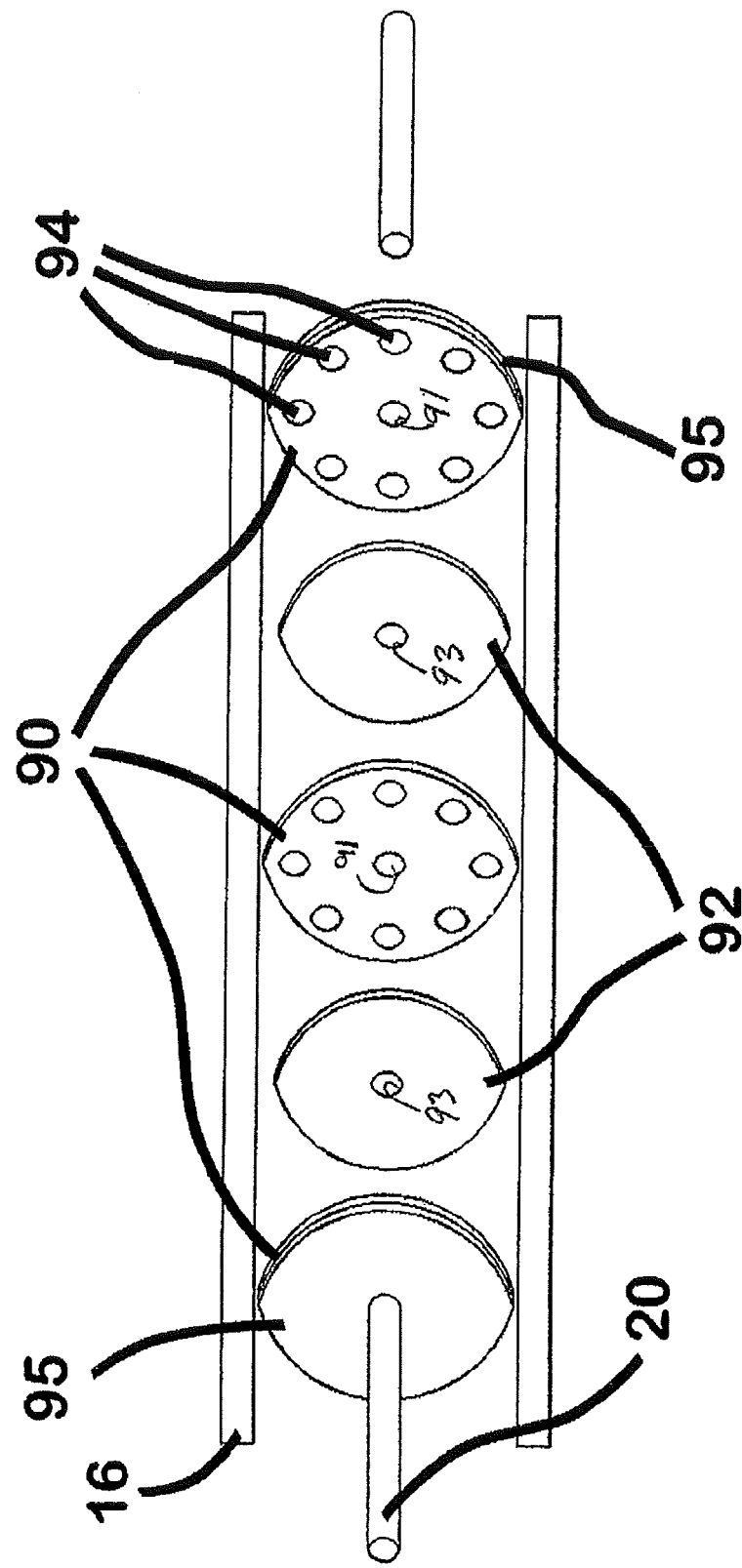

In an alternate embodiment of the present invention, the magnetic drag device is constructed with an alternating arrangement of circular magnet plates 90 and circular conductor plates 92 as shown in FIG. 8. The circular magnet plates 90 are made of nonferrous material and contain a circular arrangement of cylindrical permanent magnets 94 whose circular faces are flush with the parallel surfaces of the magnet plates 90. The magnets 94 are polarized along an axis through the flat, circular faces.

The magnet plates 90 are secured to the cylindrical steel surround 16 and contain centered apertures 91 through which the central shaft may freely rotate. The circular conductor plates 92 are smaller in diameter than the magnet plates 90, are composed of an electrically conductive material such as copper, and include central apertures 93 through which the central shaft 20 can pass for securing the magnet plates 90 to the shot. The magnet plates 90 are fixedly coupled to the shaft 20 so that they rotate in unison with the central shaft 20. The magnet plates 90 at either end of the arrangement are backed with a steel back plate 95 which provides the magnetic flux return path.

Operationally, when the central shaft 20 is engaged with the webbing reel shaft 30, the central shaft 20 and the conductor plates 92 will rotate as webbing 31 is extracted. The relative motion between the conductor plates 92 and the magnets 94 will induce eddy currents in the conductor plates 92, which will generate a retarding torque opposing the webbing 31 extraction. The number of magnet plates 90 and conductor plates 92, the number, size and composition of magnets 94 in each magnet plate 90, the effective working radius of the magnets 94, the thickness and composition of the conductor plates 92, and the clearance gap between magnet plates 90 and conductor plates 92, may all be varied to achieve the desired magnitude of retarding torque for the specific application and to achieve the desired geometric envelope of the device.

All the possible variations and modifications of this embodiment of the magnetic drag device are within the scope and spirit of the present invention.

In an alternate embodiment of the present invention, the spring motor described herein may be replaced by a simple coil spring of sufficient length and spring constant, the advantage being that less space may be consumed by the alternate coil spring, and the disadvantage being that the coil spring will not have the property of constant torque over the entire action of the spring. Such variations of spring types in the embodiment of this magnetic drag device are within the scope and spirit of the present invention.

Many modifications and variations of the present invention are possible in light of the above teachings. It is to be understood, therefore, that the invention can be practiced in manners, configurations and with components other than those specifically described. Modifications, additions and substitutions applied to the present invention are within the scope and spirit of the invention as discussed in the accompanying claims.

To recapitulate, the present invention comprises a magnetically-actuated personnel restraint system for a vehicle, and preferably a vehicle such as an aircraft. The restraint system includes a webbing reel for holding a web-like tether for managing slack in the webbing in order to safely manage user travel distance in the event of an acceleration event. The system also includes a magnetic drag device that employs permanent magnets and a conducting material in a cylindrical arrangement to generate eddy currents and produce a retarding torque that resists webbing extraction during high acceleration vehicle events, in order to reduce the occurrence of acceleration injuries and contact injuries.

A magnetically actuated clutch device is provided for engaging and disengaging the webbing reel to the magnetic drag device, so that the users of the restraint system can move freely about in a benign dynamic environment, such as in the cabin of a moving aircraft such as a helicopter or airplane; or a dynamic environment such as an inside of an ambulance or fire truck, but can be adequately restrained during high acceleration vehicle events, such as crashes and basic maneuvers. A retractor spring motor is provided for allowing extractions of the tether during normal usage, and for retracting slack tether onto the reel in order to safely maintain tether slack between the restraint device and the user.

A length controller is provided that can be adjusted by the user in order to set the maximum amount of webbing that may be extracted from the webbing reel in all circumstances, to reduce the occurrence of contact injury against a structure within the vehicle, and also against inadvertent ejection from the vehicle. Load bearing support plates, bushings, and other hardware and structures for providing structural integrity and for weather-proofing the restraint system are further provided to seal it from the environment, and possibly corrosive environmental influences such as wind, rain, salt and the like.

The magnetic drag device preferably uses permanent magnets in a polygonal arrangement within a cylinder of conducting materials to produce a restraint force that automatically increases with increasing dynamic velocity between the device and the user. This type of magnetic drag device of the present invention presents safety advantages over systems currently in use.

The magnetic drag device produces the necessary retarding force for restraining the user of the device wherein there is no mechanical contact between the components that produce the retarding forces. This differs from known prior art devices that employ friction-based components.

The webbing reel shaft rotates freely on a bushing about the central shaft until the two shafts are engaged with one another by the magnetically actuated clutch. This allows freedom of movement by the user until a dynamic event causes webbing extraction to occur above a pre-determined threshold.

The spring motor used with the present invention supplies constant torque to the reel over the operating range of a spring motor. This increases comfort to the user over the entire extent of the tether extraction, and decreases fatigue for the user during long periods of use.

The webbing reel, spring motor and clutch ring gear provided with the present invention are designed to rotate in unison during normal (clutch not engaged) operation, to thereby enable simultaneous normal operation of the webbing reel, retraction spring motor and clutch device. This simultaneous operation enables the device to immediately sense predetermined rates of reel rotation at a level sufficient to cause the clutch to become engaged. Such an immediate response is not believed to be achieved with currently available known sensing devices, such as inertial sensors for webbing acceleration sensors.

The magnetically actuated clutch device of the present invention enables engagement of the magnetically drag device based upon the velocity of rotation of the reel, rather than the acceleration of the tether or the acceleration of the vehicle. This type of velocity based device for sensing relative motion of the cargo is not believed to be currently available in any personnel restraint system.

The magnetically actuated clutch device enables engagement of the magnetic drag device at relatively low rotational rates of the reel upon which the tether is wound. Such low rotational rate engagement is not believed to be achieved with any currently available known personnel restraint systems. The magnetically actuated clutch accomplishes the engagement of the tether-containing reel and the magnetic drag device through non-contact magnetic coupling rather than through mechanical interaction. This use of magnetic interaction helps to reduce the wear and tear that are inherent in devices that employ mechanical interaction, such as the currently available friction-based clutches known to the Applicants.

Additionally, the clutch device of the present invention also accomplishes its disengagement of the reel from the magnetic drag device through magnetic interaction, to thereby also help to reduce the wear and tear that are inherent in mechanical devices.

The length controller of the present invention uses a follower ring on a threaded portion of a central shaft. The follower ring moves axially along the shaft upon rotation of the webbing reel. The user can adjust the location of a follow stop by using a control knob or other connection device. The reel is caused to cease rotation (and hence, cease paying out additional tether) whenever the follower ring contacts the follower stop. As such, the unwinding of tether beyond that length desired by the user is thereby achieved. The length controller can also employ a thrust bearing at the end of the follower stop, so that when the follower ring contacts the thrust bearing, the follower ring will not bind against the follower stop and become permanently engaged.

What is claimed is:

1. A restraint system for a vehicle, comprising:
   (a) a rotatable reel,
   (b) a flexible tether having a first end coupled to the rotatable reel and a second end, the flexible tether wound upon the rotatable reel and movable in both a winding direction and an unwinding direction,
   (c) a first shaft configured to be operably coupled to the rotatable reel, the first shaft including a plurality of magnetic elements affixed thereto;
   (d) a conductor member having a hollow interior, wherein at least a portion of the first shaft and at least a portion of the plurality of magnetic elements are disposed within the hollow interior;
   wherein movement of the flexible tether in the unwinding direction causes relative movement between the plurality of magnets and the conductor member, said relative movement causing eddy currents that generate a retarding force on the first shaft,
   wherein the conductor member includes a hollow cylinder; and
   wherein the plurality of magnets are arranged in the first shaft in an alternating polarity pattern.

2. The restraint system of claim 1, further comprising:
   a second shaft affixed to the reel; and
   a clutch operably coupling the second shaft to the first shaft.

3. The restraint system of claim 2, wherein the clutch is configured to couple the second shaft to the first shaft responsive to movement of the flexible tether in the unwinding direction at a speed exceeding a threshold.

4. The restraint system of claim 3, further comprising a limiter arrangement configured to stop movement of the flexible tether in the unwinding direction independent of whether the second shaft is coupled to the first shaft.

5. The restraint system of claim 1, further comprising a spring motor configured to cause retraction of the tether onto the reel in the winding direction.

6. The restraint system of claim 5, wherein the spring motor comprises:
   a first reel operably coupled to rotate with the rotatable reel;
   a second reel adjacent the first reel; and
   a spring coupled to the first reel and the second reel.

7. A restraint system for a vehicle, comprising:
   (a) a rotatable reel,
   (b) a flexible tether having a first end coupled to the rotatable reel and a second end, the flexible tether wound upon the rotatable reel and movable in both a winding direction and an unwinding direction,
   (c) a first shaft configured to be operably coupled to the rotatable reel, the first shaft including a plurality of magnetic elements affixed thereto;
   (d) a conductor member having a hollow interior, wherein at least a portion of the first shaft and at least a portion of the plurality of magnetic elements are disposed within the hollow interior;
   wherein movement of the flexible tether in the unwinding direction causes relative movement between the plurality of magnets and the conductor member, said relative movement causing eddy currents that generate a retarding force on the first shaft; and
   wherein the conductor member includes an inner wall formed of an electrically conductive first material, and an outer wall formed of a second material with a high magnetic permeability.

8. The restraint system of claim 7, wherein the outer wall is formed of steel.

9. A restraint system for a vehicle, comprising:
   (a) a rotatable reel,
   (b) a flexible tether having a first end coupled to the rotating reel and a second end, the flexible tether wound upon the rotatable reel and movable in both a winding direction and an unwinding direction, (c) a first shaft coupled to a plate, the plate comprising at least one pivotally connected pawl member, the pawl member operably coupled to a magnet;

(d) a second shaft coupled to a ring gear, the ring gear disposed about the at least one pawl member;

(e) a conductor member fixedly coupled to the ring gear, the conductor member configured to generate eddy currents with the magnet responsive to rotation of the first shaft;

wherein said pawl member is configured to move from an unengaged state to an engaged state responsive to said generated eddy currents, the engaged state comprising engagement of the pawl member with the ring gear; and wherein the rotatable reel is fixedly coupled to the second shaft.

10. The restraint system of claim 9, wherein the plate is substantially circular.

11. The restraint system of claim 9, further comprising a first linking member operably coupled between the pawl member and the magnet.

12. The restraint system of claim 11, wherein the first linking member is pivotally attached to the pawl member.

13. The restraint system of claim 9, further comprising a second pivotally connected pawl member.

14. The restraint system of claim 9, further comprising at least one docking member configured to cooperate with the magnet to urge the pawl member into the unengaged state.

15. The restraint system of claim 9, wherein the rotatable reel is fixedly coupled to the second shaft.

16. The restraint system of claim 9, wherein the conductor member includes a copper plate.

* * * * *